United States Patent [19]

Fernbach et al.

[11] Patent Number: 4,584,177

[45] Date of Patent: Apr. 22, 1986

[54] CATALYTIC UNIT FOR GAS PHASE CATALYSIS, MORE ESPECIALLY FOR USE WITH WOOD- AND OTHER SOLID FUEL-BURNING STOVES

[76] Inventors: Erwin A. Fernbach, 112 Talbot Road, Willowdale, Ontario, Canada, M2M 4A4; Robert A. Guerriere, 5 Charnwood Place, Thornhill, Ontario, Canada, L3T 5H2

[21] Appl. No.: 677,339

[22] Filed: Dec. 4, 1984

Related U.S. Application Data

[63] Continuation of Ser. No. 381,539, May 24, 1982, abandoned.

[51] Int. Cl.$^4$ ............................................... B01J 9/04
[52] U.S. Cl. ..................................... 422/115; 422/171; 422/172; 422/173; 422/176; 422/180; 422/191; 422/194; 422/220; 422/222
[58] Field of Search ............... 422/115, 171, 172, 173, 422/176, 180, 191, 194, 220, 222; 126/292, 293, 295, 299 F; 110/203, 210, 211, 345

[56] References Cited

U.S. PATENT DOCUMENTS

| | | | |
|---|---|---|---|
| 3,018,841 | 1/1962 | Gerlich | 422/171 |
| 3,090,677 | 5/1963 | Scheitlin et al. | 422/115 X |
| 3,144,309 | 8/1964 | Sparrow | 422/115 |
| 3,180,712 | 4/1965 | Hamblin | 422/171 |
| 3,222,140 | 12/1965 | Scivally et al. | 422/115 |
| 3,428,434 | 2/1969 | Hurko | 422/171 |
| 3,428,435 | 2/1969 | Hurko et al. | 422/180 |
| 3,544,264 | 12/1970 | Hardison | 422/181 |
| 3,656,915 | 4/1972 | Tourtellotte | 422/171 |
| 3,780,772 | 12/1973 | Carnanham et al. | 138/37 |
| 3,817,714 | 6/1974 | Wiley | 422/173 |
| 3,852,042 | 12/1974 | Wagner | 23/288 |
| 3,853,485 | 12/1974 | Hogan | 422/180 X |
| 3,869,082 | 7/1976 | Cairns et al. | 23/288 |
| 3,891,575 | 6/1975 | Brautigam et al. | 252/455 |
| 3,910,252 | 10/1975 | Richard | 126/120 |
| 3,910,850 | 10/1975 | Turner | 502/527 X |
| 3,953,176 | 4/1976 | Santala et al. | 23/288 |
| 3,967,929 | 7/1976 | Tamazawa et al. | 422/173 X |
| 4,040,252 | 8/1977 | Mosier et al. | 60/39.36 |

(List continued on next page.)

OTHER PUBLICATIONS

Powell E., "Catalytic Wood Stoves" Popular Science, Jan. 1982, pp. 77–79.

Primary Examiner—Frank Sever
Attorney, Agent, or Firm—Ridout & Maybee

[57] ABSTRACT

Flue gases containing crackable and combustible volatiles e.g. from a wood-burning stove are passed through a catalytic combustor having two spaced catalytic units each having small longitudinally extending catalytic flow passages. Air supplied into a chamber between the two units supports after-combustion of combustible volatiles in the downstream catalytic unit. Some pre-cracking and combustion takes place in the upstream catalytic unit, which serves as a gas collimator and disallows any flow of air from the intermediate chamber into the fire box of the stove, whereby combustion in the fire box can be closely controlled to increase production of combustible volatiles. Each unit may have flow passages which decrease in cross-sectional size and increase in length toward the central portion of the unit, thus encouraging uniformity of flow of the flue gases and of the catalytic reaction over the entire cross section of each unit. The units are surrounded by an air jacket into which air is supplied at one end, and the air is distributed uniformly around the periphery of the intermediate chamber. Each unit has a central bypass opening and a temperature responsive valve which closes the bypass opening when the catalytic unit reaches its threshold temperature of operation. A reflector, preferably with a curved reflective face, reflects radiant heat to the downstream fuel of the combustor, and an exterior heat exchange jacket transfers heat to the surroundings from the hot gases exiting from the combustor. A flame-arresting screen is spaced between the fire box and the combustor to prevent diffusion flames originating in the fire box from lapping on the catalytic flow passages.

14 Claims, 5 Drawing Figures

| | | | | | | |
|---|---|---|---|---|---|---|
| 4,049,388 | 9/1977 | Sheitlin et al. | 422/171 | 4,203,906 | 5/1980 | Takada et al. ............... 260/346.4 |
| 4,072,007 | 2/1978 | Sanday | 60/39.69 A | 4,218,422 | 8/1980 | Schock et al. ................. 422/171 |
| 4,072,471 | 2/1978 | Morgan, Jr. et al. | 23/288 | 4,220,625 | 9/1980 | Toh et al. ....................... 422/180 |
| 4,118,199 | 10/1978 | Volker et al. | 422/171 | 4,235,843 | 11/1980 | Tadokoro et al. ............. 422/119 |
| 4,127,389 | 11/1978 | Hackmesser et al. | 422/201 | 4,278,639 | 7/1981 | Tadokoro et al. ............. 422/171 |
| 4,144,627 | 3/1979 | Noda et al. | 29/157 | 4,300,956 | 11/1981 | Rosenburger et al. ......... 148/6.3 |
| 4,175,107 | 11/1979 | Iwaoka et al. | 422/114 | 4,345,528 | 8/1982 | Allaire et al. ................... 422/177 |
| 4,182,120 | 1/1980 | Niebylski | 60/274 | 4,363,785 | 12/1982 | Willson .......................... 422/173 |
| 4,186,172 | 1/1980 | Scholz | 422/180 | 4,373,507 | 2/1983 | Schwartz et al. .......... 422/177 X |

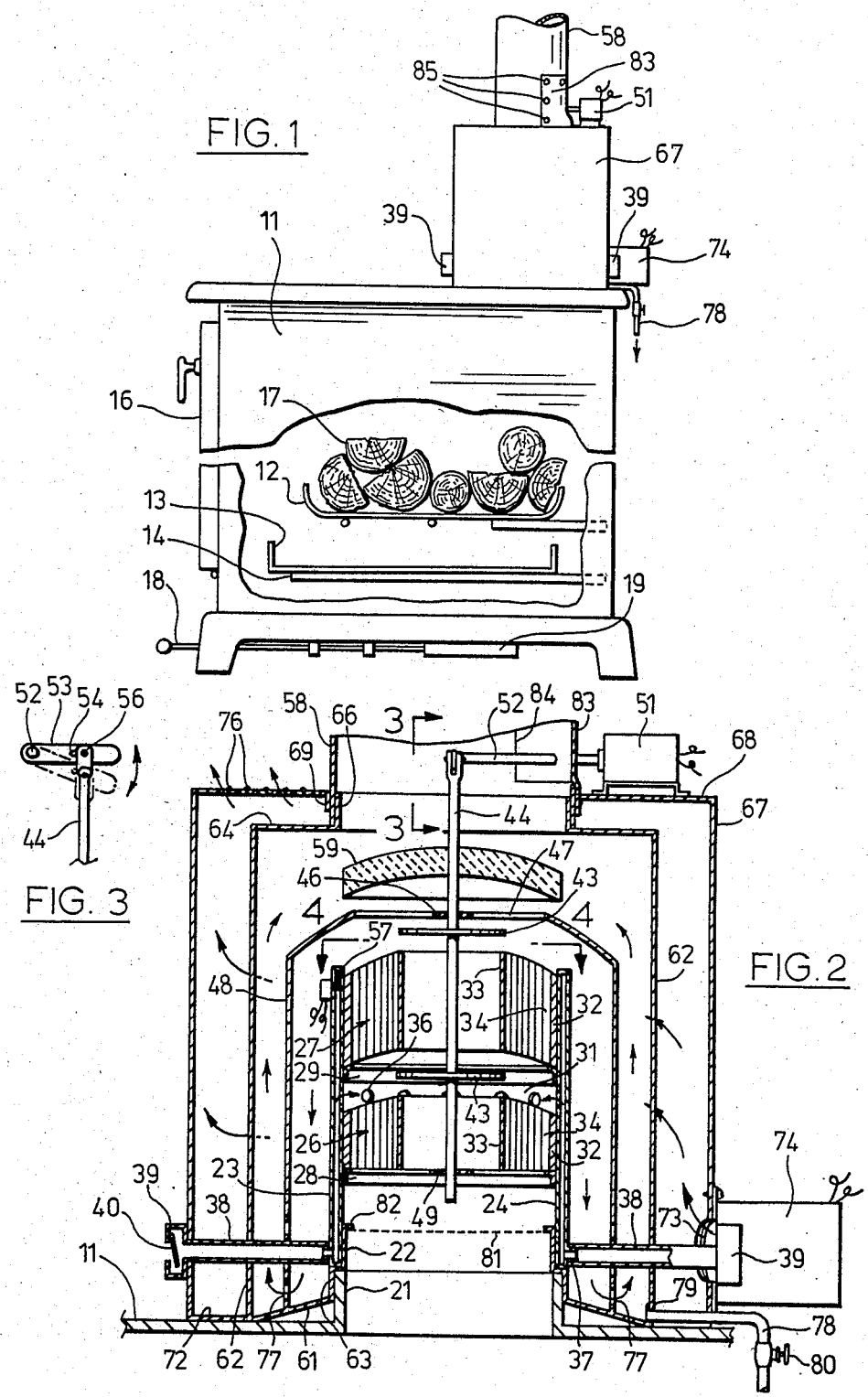

CATALYTIC UNIT FOR GAS PHASE CATALYSIS, MORE ESPECIALLY FOR USE WITH WOOD- AND OTHER SOLID FUEL-BURNING STOVES

This application is a continuation of application Ser. No. 381,539, filed May 24, 1982, now abandoned.

The present invention relates to catalytic units for gas phase catalysis, more especially, although not exclusively, suitable for use with wood- and other solid fuel-burning stoves.

In view of increasing concerns over the conservation of energy resources, there has been increasing interest in the production of heat energy by combustion of wood which represents, at least to a limited extent, a renewable energy resource. Conventional wood-burning stoves are, however, inefficient in their utilization of the energy contained in the wood fuel. With conventional stoves, much of the energy contained in the wood is wasted through loss of combustible volatiles and particulates, primarily hydrocarbons, carbon monoxide, and carbon particles which are evolved from the wood in the burning process and are normally emitted to the atmosphere with the gaseous combustion products passing up the flue of the stove. Recently, attempts have been made to recapture the energy lost in the combustion products by utilizing catalytic combustor units through which the gaseous combustion products are passed. Typically, the combustor units comprise a honeycomb-like catalyst support structure, providing a multitude of small mutually parallel flow passages. The walls of the flow passages are coated with a catalyst material, typically finely-divided palladium or platinum metal, which promotes the combustion of combustible hydrocarbons, carbon monoxide, and carbon particulates entrained in the combustion gases, and promotes cracking of the higher molecular weight hydrocarbons to a point at which the cracked hydrocarbons can readily ignite, thus releasing the chemical energy bound in all these materials.

Known catalytic wood stoves have their catalytic combustor units positioned in ducting connecting between the upper portion of the firebox of the stove and the flue outlet. Apart from the provision of air intake ports to supply a flow of air to support the combustion of the wood within the firebox, provision is made for supplying air through secondary air intake ports which supply air to the upper region of the firebox adjacent the lower surface of the catalytic combustor unit, to provide a supply of air for supporting the after-combustion of the combustible volatiles in the catalytic unit.

It has, however, been determined that in order to improve the efficiency of the release of energy from the fuel source, it is desirable to control the access of air to the firebox so that the conditions in the firebox approach as closely as possible true pyrolysis of the fuel i.e. a slow and incomplete oxidation of the fuel, with little or no flaming occurring. This provides a stable combustion of the fuel, and yields large quantities of crackable and combustible volatiles whose energy content can be liberated efficiently through cracking and after-combustion in the catalytic unit. With the known catalytic stoves, however, it is impossible to achieve true pyrolysis in the firebox, as the air supplied through the secondary air intakes at the upper part of the firebox diffuses downward into the region of primary combustion of the fuel, resulting in an elevated oxygen concentration adjacent the fuel, and resulting in flaming of the fuel so that true pyrolysis conditions are impossible to maintain.

In one aspect, the present invention employs a firebox having a flue aperture to which is connected a duct in which is located a combustor unit comprising two longitudinally spaced catalytic units, defining a chamber between them. Each catalytic unit has a multitude of longitudinally extending small catalytic flow passages, and air for supporting the after-combustion in the combustor unit is supplied to the intermediate chamber. With this arrangement, some of the secondary air fed into the intermediate chamber diffuses toward the firebox through the upstream catalytic unit proximate to the firebox, to support partial after-combustion of the volatile combustibles, but owing to the pressure gradient between the firebox and the combustor unit, and owing to the flow-directing function of the longitudinal flow passages in the upstream catalytic unit, which functions as a gas collimator, there is negligible penetration of the secondary combustion air into the firebox, so that conditions at least approximating true pyrolysis can be maintained in the firebox. The heated gases which have been partially burned in the upstream combustor enter the intermediate chamber, where they efficiently form a homogeneous pre-mixture with the incoming secondary air, due to the turbulence in the intermediate chamber, and are subjected to further combustion in the second or downstream catalytic unit.

The catalytic combustors described herein may also be used to advantage with stoves for burning solid fuels of organic biomass origin other than wood, for example peat, and pelletised wood bark and sawmill waste products. The usual catalyst materials, however, tend to be poisoned by sulfur present in some solid fuels such as coal, and therefore such fuels are desirably not employed with stoves equipped with the combustors.

In a further aspect, the invention relates to arrangements for providing for the flow of gases through a gas phase catalytic unit to be made more uniform across the entire cross-section of the unit. With the above-described known forms of catalytic combustor, for example, the present inventors have observed that there is a tendency for the combustion rates and temperatures to reach a maximum adjacent the central portion of the catalytic unit while much lesser reaction rates temperatures prevail around the peripheral portions of the unit. This arises because it is inherent in the flow of a fluid through a duct that the flow adjacent the walls of the duct is subject to a greater viscous drag with the result that the velocity of the flow adjacent the central portion of the duct is higher than the velocity adjacent the walls. For example, with a circular section duct, the flow velocity increases as the 1.6 power of the distance from the duct wall. Where there is only a low pressure gradient across the catalytic unit, as for example in the case of catalytic combustors for wood and other solid fuel stoves, this non-uniformity of flow is especial pronounced, and leads to concentration of the catalytic reaction in the middle portion of the catalytic unit. In the case of after-combustion units for solid fuel stoves, there is the problem that when only relatively low temperatures are attained adjacent the periphery of the unit, there is a greater tendency for condensation of the more readily-condensible high molecular weight hydrocarbon components of the gaseous combustion products. The condensed-out hydrocarbons tend to plug up the flow passageways through the peripheral regions of the catalytic unit, thus intensifying the non-uniformity of the flow, and eventually leading to complete plugging up and de-activation of the unit.

In one aspect, the invention provides the catalytic unit with flow passages of differing cross-sectional areas, the flow passages being of relatively larger cross-section adjacent the side wall of the catalytic unit, and being of progressively decreasing cross-section toward the central region of the unit. In this manner, less flow resistance is offered adjacent the periphery of the unit, whereby the rate of flow of the reactants through the unit, and hence the rate of the catalytic reaction over the entire cross-section of the catalytic unit can be made more uniform, thus reducing or avoiding the problems mentioned above.

In some cases, however, limits are imposed on the cross-sectional areas of the flow passages. Thus, for example, in the treatment of solid fuel combustion gases, it is preferable that the maximum cross-sectional dimension of the catalytic flow passages should not exceed about 0.6 $cm^2$ since at cross-sectional areas much above this size, there is insufficiently intimate contact between the combustion gases and the catalytic material supported on the walls of the flow passageway and, because of the relatively low flow rate of the reactant gases, it may not be possible to achieve the high temperatures which are desired to be produced by catalytic combustion of the reactants in order to create and sustain efficient after-combustion. Further, solid fuel combustion gases normally contain large proportions of particulate materials, and it is therefore desired that the minimum cross-sectional area of the catalytic flow passageway should not be less than about 0.4 $cm^2$, as at cross-sections much below this, there is a risk of the passageways becoming clogged by the gas-borne particulates.

In a further aspect, the invention provides the catalytic unit with catalytic flow passages which are of differing lengths, the flow passages being relatively shorter in length adjacent the side wall of the unit, and being of progressively increasing length toward the central region of the unit. The longer flow passages provide greater resistance to flow, and therefore tend to slow down the flow adjacent the central portion of the unit and increase the flow rate adjacent the side wall of the unit, thus tending to make the flow through the unit, and hence also the degree of combustion reaction, more uniform over the entire cross-section of the unit. These flow passages of varying length may also have the above-described variation in cross-sectional dimension thus providing for uniformity of flow without undue distortion of the longitudinal section of the catalytic unit. Although one form of catalytic unit having the above-discussed catalytic flow passages of varying cross-section and varying length will be described in detail below in connection with the treatment of combustion gases it will be readily appreciated that these principles can be applied in the construction of gas phase catalytic units for promoting other gas phase reactions, in order to utilize the catalytic material supported on the flow passage walls more efficiently, by providing greater uniformity of the catalytic reaction over the entire cross-section of the catalytic unit.

In a further aspect, the invention provides a catalytic combustor unit comprising a longitudinal duct having inner and outer walls defining an air jacket between them. A combustor unit comprising two longitudinally porous catalytic units are spaced apart within the inner duct wall and are in heat exchange relationship with the inner duct wall. The two spaced catalytic units define a mixing chamber between them. The air jacket extends continuously from one end of the combustor unit to its opposite end, and an air supply means is connected to one end of the air jacket. Air inlet means are provided communicating between an intermediate portion of the air jacket and the mixing chamber. The air inlet means may comprise a series of regularly spaced air inlet ports, or other means for distributing air uniformly from the air jacket around the periphery of the mixing chamber. Whereas the inventors are aware that in U.S. Pat. No. 4,218,422 in the name D. N. Schock et al, dated Aug. 19, 1980, it has been proposed to employ a dual catalytic converter structure for treatment of internal combustion engine exhaust gases, this was for the purpose of providing a preliminary reduction of nitrogen oxides which are not present to any significant extent in the combustion gases from wood-burning stoves. Further, in the Schock et al patent, the dual converter has two catalytic beds defining between them a mixing chamber surrounded by an air jacket and with an air inlet at one side of the mixing chamber. With this arrangement, owing to the position of the air supply pipe, there would be a tendency for the air supplied into the mixing chamber to mix non-uniformly with the gases entering the mixing chamber. With the present arrangement, as the air supply means are connected at one end of an elongated air jacket, the supply of air into the mixing chamber can be made much more uniform, whereby the intensity of the catalytic reaction may be distributed more uniformly and more efficiently over the entire cross-section of the catalytic unit.

It may be further noted that in the arrangement of the above-mentioned Schock et al U.S. Pat. No. 4,218,422, it is inherent in the treatment of internal combustion engine exhaust gases that the gases are fed to the catalytic unit under high pressures and at high volume flow rates, with a high pressure differential being created across the catalytic beds. In such case, the above discussed problems of air diffusion back through the upstream catalytic bed do not arise, and, owing to the high volume flow rates, the greater turbulence in the mixing chamber compensates, at least for the most part, for the tendency for the incoming air to be introduced non-uniformly into the mixing chamber.

The inventors have further observed that with the known catalytic combustor units for wood stoves, the efficiency of the catalytic reaction is not as great as may be desired, since relatively cooler gas present in the flue on the downstream side of the catalytic combustor units is liable to diffuse in the upstream direction under the low volume flow rate conditions normally prevailing in the flue and thus exert a cooling effect on at least the downstream end face of the catalytic unit. Normally, it is desired to maintain the catalytic unit above at least a certain minimum temperature, since normally there is a minimum temperature below which the catalytic material will not function efficiently as a catalyst. In one aspect, in order to increase the temperature of at least the downstream end face of the catalytic unit, and alleviate the above-mentioned problems, the invention provides an arrangement in which a heat-reflective member is disposed adjacent the downstream face of the catalytic unit, and has a radiant-heat reflective inner face spaced from and co-extensive with said downstream face of the catalytic unit, for reflecting to the end face heat radiated from the catalytic unit. In the preferred form, the heat-reflective member comprises a refractory material, and has its reflective face concavely curved with respect to the downstream face of the catalytic unit.

As discussed above, normally the catalytic material will not be effective as a catalyst below a certain minimum temperature, and it is therefore desirable to provide a bypass arrangement whereby the combustion gases can, on ignition of the stove, initially be made to bypass the catalytic unit until this has reached its threshold or minimum operating temperature, to avoid problems of the catalytic flow passages becoming plugged by deposits of condensed out creosote and like high molecular weight hydrocarbons. The bypass is also desired to be used in the event that the catalytic material becomes deactivated, for example through catalyst poisoning e.g. by heavy metal ions as a result of metal foils or printed papers carrying heavy metal pigments having been inadvertently included in the charge of materials to be burnt in the stove. Desirably, the bypass is provided by a relatively large diameter opening formed through the central portion of the catalytic unit, whereby on initial firing of the stove, the catalytic unit is rapidly heated as a result of the hot combustion gases passing preferentially through the relatively large diameter opening in the catalytic unit.

In a further aspect, the present invention provides a longitudinally porous catalytic unit with a longitudinal gas bypass opening formed centrally through the unit, and having a valve member associated with the bypass opening and means for moving the valve member selectively to wholly close or open the bypass opening. The inventors are aware that in U.S. Pat. No. 4,175,107 in the name Iwaoka et al issued Nov. 20, 1979, it has been proposed to employ a central bypass opening through a catalytic convertor for treatment of internal combustion engine exhaust and industrial exhaust gases, with a flow control arrangement which only partially constricts the bypass opening. For present purposes, however, the use of a valve member which can wholly close the bypass opening or leave the bypass opening open has the advantage of increasing the efficiency of the present catalytic combustor unit, as in the wholly closed position of the valve member all the relatively low pressure combustion gases are passed through the effective catalytic portion of the catalytic unit, while in the wholly open position of the valve member, the relatively low pressure combustion gases will pass preferentially through the central bypass opening and avoid problems of the catalytic flow passages becoming clogged with easily-condensible hydrocarbon vapor deposits.

In a still further aspect of the present invention, the said valve member for the bypass opening is provided with temperature responsive control means responsive to the temperature of the catalytic unit and moving the valve member toward a position relatively closing the bypass opening when the temperature exceeds a predetermined limit, and moving the valve member toward a position relatively opening the bypass opening when the temperature falls below a predetermined limit. This arrangement therefore provides for the bypass opening to be automatically opened on initial firing of the stove, and the temperature responsive means can be arranged to close the bypass opening when the catalytic unit reaches at least its minimum effective operating temperature. It may be noted that in the arrangement disclosed in the Iwaoka et al patent, the flow control means function in the reverse manner i.e. they operate to constrict the bypass opening as the temperature of the catalytic unit falls, and serve to relatively open the bypass opening as the temperature rises.

The inventors have still further observed that with the known catalytic wood stoves, at least in the initial and intermediate stages of combustion of the charge of wood in the firebox, the combustion proceeds with flames of the "diffusion" type arising from the wood charge. The diffusion flames result from ignition of a relatively rich gas mixture of hydrocarbons distilling from the wood charge. With the known catalytic wood stoves, these diffusion flames can project from the firebox directly into contact with the lower surface of the catalytic combustor unit. As the flame comprises a gas mixture which is too rich for efficient after-combustion in the catalytic unit, at least a proportion of the combustible components of the inner region of the flame pass unchanged through the catalytic unit, and thus represent a loss of energy to the system. Further the rich mixture may inhibit the catalytic material. In still a further aspect, the present invention provides a flame-arresting screen extending transversely across the duct containing the catalytic combustor unit. In use, the screen is arranged so that it is spaced between the firebox and the upstream end of the catalytic combustor unit. These flame-arresting screens are in themselves well known, as in the conventional Davy screen as used in the miners' safety lamp and comprise mesh openings which are of such small size that a flame cannot penetrate through them. In the present arrangement, the screen prevents penetration of the flame to the catalytic combustor unit itself, and permits the rich combustion gases associated with diffusion flames to become intermingled with the remaining gaseous combustion products in the space defined between the screen and the upstream end of the catalytic unit, whereby a gas mixture adapted for more efficient combustion in the catalytic unit can be obtained, and the above problems avoided or at least alleviated.

Examples of a wood stove and of a catalytic unit embodying the above-noted several aspects of the invention are described in more detail below, by way of example only, with reference to the accompanying drawings, in which:

FIG. 1 shows a side view of a wood stove with a catalytic after-combustion unit, with portions cut away to reveal interior structure;

FIG. 2 shows a partially schematic vertical section through the catalytic unit of the stove of FIG. 1;

FIG. 3 shows a side view within the unit of FIG. 2, taken on the line 3—3 in FIG. 2;

Figure 4:
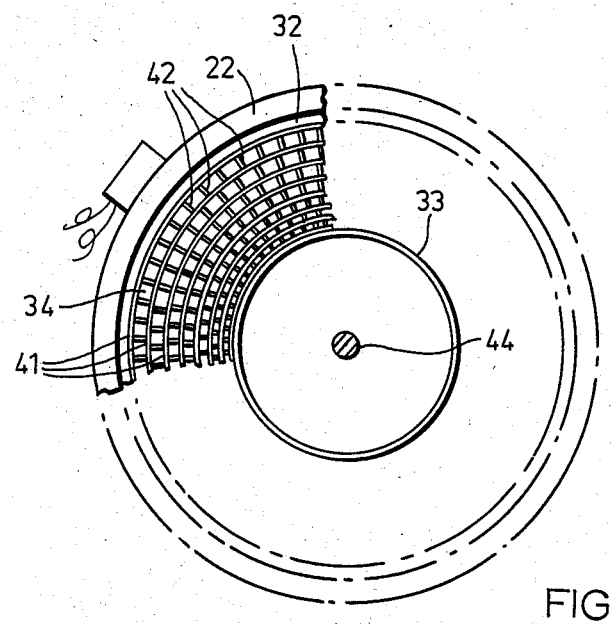
FIG. 4 shows a partial plan view along the line 4—4 in FIG. 2.

Referring to the drawings, wherein like reference numerals indicate like parts, FIG. 1 shows a wood-burning stove with a firebox 11, a grate 12 supported on the rear wall of the firebox, an ashpan 13 supported on a platform 14 connected to the rear wall of the firebox, a pivoting front door 16 through which a charge of wood 17 to be burnt can be introduced and a damper control 18 for adjusting a damper plate 19 on the underside of the firebox. The damper plate 19 controls access of primary combustion air into the firebox 11 through primary air inlet openings (not shown) in the lower wall of the firebox.

At its upper side, the firebox 11 is formed with a flue aperture defined by an upstanding circular wall 21. A cylindrical air jacket 22 forming a tubular duct is seated on the upper side of the wall 21. The jacket 22 comprises an outer cylindrical wall 23 and an inwardly spaced cylindrical wall 24 concentric with wall 23 and defining an annular space therebetween. The annular-section space is closed at its upper and lower ends by horizontally-extending annular wall pieces. First and second catalytic units 26 and 27 are supported within the jacket 22 at their lower edges by respective ring supports 28 and 29 connected to the inner wall of the jacket. The units 26 and 27 are spaced one above the other to form a mixing chamber 31 therebetween.

Each catalytic unit 26 and 27 consists of a cylindrical outer wall 32, preferably of metal because of its good thermal conductivity, disposed in contact with the inner wall 24 of the jacket 22, and an inner cylindrical wall 33, defining a relatively large cylindrical bypass opening through the central portion of the unit 26 or 27.

As shown in FIGS. 2 and 4, in the preferred form, each catalytic unit consists of a multitude of longitudinally-extending tubular flow passages 34 which, as best seen in FIG. 4, are of relatively large cross-section adjacent the outer wall 32 and progressively decrease in cross-section toward the central region, terminating at the inner wall 33. As seen in FIG. 2, the passageways 34 are also of differing lengths, the passageways adjacent the outer wall 32 being relatively shorter and the length progressively increasing toward wall 33. In the example shown, the lower catalytic unit 26 has a lower or upstream face which conforms generally to a plane extending transversely of the duct or jacket 22, and the upper surface has a convex domed surface. The lower surface of the upper catalytic unit 27 is concavely domed to conform to the curvature of the upper surface of the lower unit 26, so that the mixing chamber 31 has a uniform vertical dimension. The upper surface of the upper unit 27 has a more pronounced domed curvature or smaller radius of curvature than its lower face.

Adjacent the mixing chamber 31, the inner wall 24 of the jacket 22 is provided with a series of air inlet ports 36 through which secondary air can enter the mixing chamber 31 from the annular space within the jacket 22. The vertical positioning of the ports 36 with respect to the adjacent end surfaces of the units 26 and 27 is chosen to provide optimum mixing of the incoming air with the combustion gases. In any given case, the optimum positioning of the ports 36 to achieve good turbulent mixing of the air and combustion gases can be determined by trial and experiment. Adjacent one side of each port 36, a lip of the material of the inner wall 24 may be deformed inwardly by a small distance so that the air flow through each port 36 is deflected non-radially to create a vortex within the mixing chamber 31 and promote homogeneous mixing of the incoming air with the combustion gases.

At the lower end, the outer wall 23 of the jacket 22 has two or more air inlet openings 37. The air inlet openings 37 are spaced regularly around the periphery of the lower end of the jacket 22. On each opening 37 is fitted an air inlet pipe 38 which communicates with the atmosphere at its outer end through a small valve housing 39. A flap valve 40 is supported within the housing 39 adjacent an air inlet opening on the outer side of the housing 49, forming a one-way valve.

The walls of the individual flow passages 34 are coated with a catalytic material suitable for promoting cracking of hydrocarbons and combustion of carbon monoxide and carbon particles present in wood-combustion gases. Various catalytic materials are known for this purpose, and coatings of platinum or palladium are generally preferred, although the nature of the catalytic material itself forms no part of the present invention.

In use, the upstream catalytic unit 26 serves as a pre-combustor and gas collimator for the wood combustion gaseous products passing upwardly from the firebox 11 through the flue aperture. Some oxygen capable of supporting combustion will normally be present in the combustion gases issuing from the firebox 11, and is supplemented by some oxygen diffusing downwardly from the chamber 31. Partial hydrocarbon cracking and after-combustion take place in the unit 26, and, as a result, the viscosity of the gases passing through the first or upstream unit 26 is substantially reduced. The partially burned and heated gases enter the mixing chamber 31 where secondary air is fed in through the array of air inlet ports 36. This secondary air is preheated as a result of its passage through the air jacket 22 in heat exchange relationship with hot gases passing upwardly through the catalytic units 26 and 27 and with hot gases passing downwardly over the exterior of the jacket 22 in normal operation, as is described in more detail below, so that the secondary air is heated to at least the temperature at which the catalytic material ignites the combustibles entering the lower face of the upper unit 27. The air and combustibles mix homogeneously in the mixing chamber 31 as a result of turbulence and the mixture enters the upper catalytic unit 27 at temperatures greater than at the lower face of the lower combustor 26. Spontaneous ignition occurs at the lower face of the unit 27, and propagates toward its upper face. Typically, the temperature gradients achieved axially of the catalytic units 26 and 27 will be approximately 40° to 60° C./cm. As will be noted from FIG. 2, the tubular catalytic flow passages of the second or upstream unit 27 are substantially longer than those of the lower unit 26, to provide adequate residence times in the unit 27, since the gases are less viscous than those passing through the unit 26, and, having been mixed with the secondary air, pass at a higher flow rate through the upper unit 27. The lengths and the aggregate cross-sectional areas of the flow passages through the catalytic units 26 and 27 can be selected to achieve maximum power outputs in accordance with the rates of production of combustible volatiles obtained through combustion of a typical charge of wood fuel. Once in steady-state operation, the temperatures reached in the catalytic flow passages are such that the upper catalytic unit 27 and, to a lesser extent, the lower catalytic unit 26, glow red hot.

The flow-directing effect of the flow passages in the lower or upstream catalytic unit 26 serves to disallow any significant flow of secondary air from the mixing chamber 31 into the fire box 11 against the pressure gradient built up in the unit 26. The air supplied into the mixing chamber 31 will therefore not penetrate to the firebox 11 beyond the negligible amount of air diffusing against the pressure gradient, and therefore it is possible to control the combustion conditions in the firebox 11 to maintain conditions at least approaching true pyrolysis for prolonged periods.

The flow of secondary air introduced through the inlet pipe 39 and the inlet ports 36 is self-regulating, being controlled by the slightly sub-atmospheric static pressure developed in the mixing chamber 31. As a result, the one way flap valve 40 is normally held in the open position as shown in FIG. 2, and tends to open progressively as the pressure in the chamber 31 falls below the pressure of the surrounding air. In the event of a temporary overpressure developing in the mixing chamber, the flap valve 40 is deflected outwardly to close the opening in the housing 49 to prevent escape of combustion gases to the surroundings. The uniform vertical dimension of the mixing chamber 31, the regular spacing of the ports 36 and of the inlet openings 37 of the jacket 22, and the spacing of the ports 36 from the inlet openings 37, serve to encourage uniform mixing of the combustible gases and air uniformly over the entire lower surface of the upper catalytic unit 27, and to distribute the mixed gases uniformly over this lower surface.

The geometric configuration of the flow passages through the catalytic units 26 and 27, with shorter and wider flow passages adjacent the inner wall of the duct 22 tends to promote flow of the gas mixtures through the peripheral regions of the catalytic units 26 and 27, and is arranged to overcome the tendency of the upward flow to occur predominantly through the regions of the units proximate to the centre of the duct, and thus distributes the total catalytic combustion efficiently and uniformly across the entire cross-section of each catalytic unit.

Desirably for the reasons discussed above, the largest cross-sectional flow passages adjacent the outer walls 32 of the units are no larger than about 0.6 cm$^2$, and the smallest flow passages adjacent the inner walls 33 are no smaller than about 0.4 cm$^2$ in cross-section. In any given case, the desired variation in the length of the flow passages 34 in order to achieve uniform burning across the entire cross-section of the catalytic units 26 and 27, can be readily determined by trial and experiment or can be calculated from standard formulae governing fluid flow through restricted passageways, these formulae being familiar to those skilled in the art.

In the example illustrated in FIGS. 2 and 4, the passages 34 formed through each catalytic unit are provided by a series of concentric metal cylinders 41, the radial spacing between each cylinder 41 decreasing progressively toward the inner wall 33. The flow passages 34 are defined circumferentially by vertically extending radially-disposed fins 42 connected e.g. by brazing between adjacent pairs of walls 41, the spacing between the adjacent fins 42 diminishing progressively in successive concentric layers inwardly from the side wall 32, thus forming the flow passages 34 of diminishing cross-sectional area. The axial lengths of the concentric walls 41 and the fins 42 are configured to conform to the domed profiles illustrated in FIG. 2.

In the example shown, the central bypass opening through each catalytic unit 26 and 27 is provided with a drop valve in the form of a circular plate 43. The plates 43 are connected on a vertically-shiftable rod 44 which is guided in an upper guide 46 supported on a spider connected at its periphery to an upper opening 47 in a bell 48. The rod 44 is also guided in a guide 49 adjacent its lower end supported on a spider connected to the inner wall 24 of the jacket 22. In the preferred form, movement of the rod 44 is controlled by an electric motor 51 mounted on the exterior of the catalytic unit. The motor 51 rotates a shaft 52 on which is connected a lever 53. The lever 53 is provided with a camming slot 54 in which slides a pin 56 connected on the upper end of the rod 44, so that when the shaft 52 rotates through a small arc, the rod 44 together with the drop valve plates 43 can move downwardly, to the position shown in broken lines in FIG. 3, in which the plates 43 seal on the upper ends of the inner walls 33 of the units 26 and 27. The operation of the motor 51 is controlled by a temperature probe 57 connected on the outer side of the upper end of the jacket 22, and responsive to the temperature of the upper catalytic unit 27. Control apparatus similar to that employed in conventional temperature responsive motor-powered automatic dampers may be employed. The function of the control apparatus associated with the motor 51 is that when the catalytic unit 27 is at a temperature below a predetermined limit, the rod 44 is maintained in the upper position, as shown in FIG. 2, and as shown in solid lines in FIG. 3. When the temperature sensed by the probe 57 exceeds a certain predetermined limit, the motor 51 is actuated to rotate the shaft 52 through a small arc to lower the rod 44 together with the drop valve plates 43, as shown in broken lines in FIG. 3, in which the drop valve plates 43 seal off the central openings through the units 26 and 27. Thus, on ignition of the charge of wood in the wood stove, the gaseous combustion products pass upward through the central openings in the units 26 and 27, which serve as bypass openings. As the hot combustion products pass centrally through the openings, they efficiently warm the units 26 and 27. When these have reached a temperature at which the catalytic material can efficiently function, the temperature sensed by the probe 57 causes the motor 51 to be actuated to rotate the shaft 52 through a small arc, lowering the rod 44 to the position shown in broken lines in FIG. 3, in which the plates 43 seal off the bypass openings, with the result that the combustion gases then pass through the catalytic flow passages 34 in the units 26 and 27. The temperature at which the control apparatus is pre-set to lower the drop valve plates 43 and close the bypass openings depends on the threshold temperature of operation of the catalytic material employed, but will typically be about 400° F. The control apparatus associated with the motor 51 may also include a manual override switch, allowing the motor 51 to be actuated to raise the drop valve plates 43 irrespective of the temperature sensed by the probe 57, to permit the bypass openings to be opened in the event that smoking is observed in the flue gases exiting from the unit through a stack 58 connected to the upper part of the unit. Smoking indicates that the catalytic material in the flow passages of the units 26 and 27 has become de-activated, and there is then a risk that the flow passages 34 in the units 26 and 27 may become clogged with deposits of unburnt hydrocarbon materials. In such case, it is desired that the bypass openings should then be opened to permit the combustion gases to pass freely out of the stove through the bypass openings to the stack 58. It may be noted that in normal operation of the catalytic unit, in which the drop valve plates 43 are in the lowered position, it is important for efficient operation that the plates 43 form a good seal with the inner wall 33, so that all the combustion gases are forced to pass through the flow passages 34.

In their closed positions, the plates 43 define with the inner walls 33 of the units 26 and 27 cylindrical mixing chambers which are closed at their upper ends by the plates 43. These closed mixing chambers add to the turbulence of the gas flow, thus providing good mixing of the gases passing to the upstream sides of the respective units 26 and 27.

A heat-reflective slab of ceramic material 59 is connected on the upper part of the central rod 44. The lower side of the slab 59 has a concave surface, preferably of slightly larger radius of curvature than the downstream face of the upper unit 27, and is co-extensive with this upper face. In the normal operating condition, in which the drop valve plates 43 close the bypass openings and the combustion gas is passed through the catalytic flow passages of the units 26 and 27, the slab 59 seats on the periphery of the opening 47 in the bell 48 and closes the opening 47. The concave lower surface of the slab 59 serves to reflect radiant heat to the catalytic unit 27 and serves to prevent or alleviate problems of thermal shock at the downstream face of the catalytic unit 27 which could lead to erratic firing of the combustible gas mixture passing through the upper unit 27, and could lead to premature cut-out and loss of catalytic action of the unit 27 at very low power outputs due to diffusion of cooled gas molecules into the downstream face of the catalytic unit 27.

In the lower position, the slab 59 serves to direct the hot gases issuing from the downstream side of the catalytic unit 27 downwardly through the bell 48. The lower edge of the bell 48 rests on a conical lower wall 61 of a casing having a cylindrical main wall 62 spaced outwardly from the bell 48. At its inner edge, the conical wall 61 is formed integrally with an upwardly extending wall portion 63 which seats in a gas-tight manner against the outer side of the upwardly extending flue aperture wall 21, and the casing includes a horizontal annular upper wall member 64 which rests on the top of the main wall 62. The wall member 64 is formed with a central opening surrounded by an upper cylindrical wall 66 formed integrally with the horizontal wall 64. The cylindrical wall 66 is received in a gas-tight manner within the lower end of the stack 58. An outer heat exchanger air jacket is defined around the casing 62 by an outer housing 67. This has a horizontal annular upper wall 68 formed at its inner edge with a downwardly turned lip 69 which seats in gas-tight manner on the outer side of the stack 58, a main cylindrical wall 71, and a lower inwardly extending wall 72 which rests on the upper surface of the firebox 11. At one side, the housing 67 has adjacent its lower end an air inlet opening 73 through which air is forced into the housing 67 from the atmosphere by a fan 74. The air circulates within the housing 67 over the exterior of the casing wall 62 and passes out into the atmosphere through vent openings 76 provided in the horizontal upper wall 68 of the housing on the side opposite the air inlet opening 73. In normal operation, with the slab 59 in its lower position closing the opening 47 in the bell 48, the hot gases issuing from the upper catalytic unit 27 pass downwardly as indicated by the arrows in FIG. 2 between the bell 48 and the outer side of the inner air jacket 22 and flow radially outwardly through perforations 77 formed through the lower portion of the bell 48. The hot gases then flow upwardly through the space defined between the outer side of the bell 48 and the casing wall 62, in heat exchange relationship with the air circulating between the housing 67 and the outer side of the casing wall 62, so that this air is warmed, and the cooled combustion gases pass outwardly through the stack 58. As there is rapid cooling of the hot gases within the casing 62, water vapor condenses out within the casing 62. A drain line 78 is connected to an opening 79 in the lower end of the casing 62, and is controlled by valve 80, to permit the condensate which collects in the lower portion of the casing 62 to be drained off at intervals.

It will be noted that initially, and until the upper catalytic unit 27 has attained its proper operating temperature, the slab 59, which is connected to the rod 44, will be maintained in the raised position shown in FIG. 2, thus allowing the combustion gases issuing through the bypass opening 33 in the upper catalytic unit 27 to pass direct to the stack 58 through the opening 47 in the upper end of the bell 48. This therefore provides for minimum constriction of the exiting flow path for the combustion gases during the starting-up phase of combustion in the firebox 11. Further, during this starting-up phase, the fuel charge in the firebox 11 undergoes drying, and the combustion gases contain excessive amounts of water vapor so that, if at this stage the combustion gases were to be flowed downwardly through the bell 48 and into heat exchange relationship with the casing wall 62, excessive amounts of water vapor would condense out. When the catalytic unit 27 has reached its proper operating temperature, the rod 44 and the slab 59 are lowered, through the automatic temperature-response control mechanism described above, so that the opening 47 is then shut off and the hot combustion products are forced downwardly through the bell 48 into heat exchange relationship with the air circulating within the outer housing 67.

In the preferred form, as shown in FIG. 2, a flame-arresting screen 81 is provided spaced beneath the upstream or lower face of the lower catalytic unit 26. The screen 81 extends transversely over the whole area of the duct opening of the air jacket 22, and is supported at its edges by a ring member 82 attached to the inner wall 24 of the air jacket 22. The screen 81, which may for example be a stainless steel screen, and which may be coated with a ceramic material coating of relatively high thermal conductivity in order to avoid poisoning of the catalytic surfaces of the units 26 and 27 through sublimation of metal from the screen 81, is formed with mesh apertures of such small size that flames can not propagate through the screen 81. The screen thus suppresses lapping of diffusion flames which originate in the firebox 11 direct on the upstream face of the catalytic unit 26. As discussed above, such diffusion flames contain an over-rich mixture of combustible components which, if channelled directly to the combustor unit 26 could not be oxidized efficiently within the catalytic flow passages. Further, the hydrocarbon rich gases of these flames may inhibit the catalytic material. With the present arrangement, as the screen 81 is spaced downwardly from the upstream face of the unit 26, any diffusion flames reaching the screen 81 will be arrested at the screen 81, and the rich mixture proceeding upwardly from the screen 81 will have opportunity to mix with the other components of the gas stream passing upwardly through the jacket 22, thus providing a mixture better adapted for combustion within the catalytic flow passages 34, and reducing the risk of local inhibition of the catalytic material.

Although the above detailed description has referred to a combustor unit used with a wood-burning stove. It will be appreciated that these combustor units may also be used to advantage with stoves adapted to burn other fuels which on gentle pyrolysis can produce large quantities of catalytically combustible materials and hydrocarbons which can be cracked to yield readily combustible products. Desirably, the fuel material is derived from the organic biomass and does not yield volatiles such as sulfur which can act as catalyst poisons. Thus, the combustor unit can advantageously be used with peat-burning stoves and stoves adapted to burn pelletised organic materials such as wood bark and sawmill waste.

It may be noted that the apparatus as shown in the drawings is designed so as to be readily assembled and disassembled and to be readily applied as a retro-fit to existing stoves. The shaft 52 connected to the motor 51 is disengagable from the motor 51, and passes slidingly through an aperture formed in a detatchable part-cylindrical plate 83 which is held tightly in registry with the sides of an aperture 84 formed in the side of the stack 58. The plate 83 is held tightly on the stack 58 by, for example, screws 85 passing through the plate 83 and the side of the stack 58. Sealing means (not shown) are provided where the shaft 52 passes through the plate 83, to render the stack gas-tight at this point, and to permit the shaft 52 to be rotated and moved laterally relative to the plate 83. With the shaft 52 disengaged from the motor 51, and the plate 83 disengaged from the stack 58, access can be had to the interior of the stack 58 to disengage the pin 56 from the lever 53, thus leaving the upper end of the rod 44 free. The stack 58, as is customary, is formed in sections, and the lower section of the stack 58 can be disengaged from the upper ends of the housing 68 and the casing 62 by withdrawing it upwardly. The air pipes 38 and the drain line 78 can be withdrawn laterally from the openings 37 and 79, and the apparatus can then be disassembled by lifting off the outer housing 67 and lifting the horizontal upper walls 64 of the casing upwardly from its seating on the top of the main wall 62 of the casing. The bell 48 together with the rod 44, the slab 59 and the valve plates 43 can then be withdrawn upwardly through the opening in the top of the casing 62, and lastly the air jacket 22 together with the catalytic units 26 and 27 and the screen 81, can be lifted from its seating on the upstanding wall 21 of the flue aperture. In re-assembly of the apparatus, or when fitting the apparatus to an existing stove, the apparatus is assembled following the above steps in reverse order.

In order to prevent escape of combustion gases into the surroundings, conventional high temperature-resistant packing materials, for example of ceramic fibre material may be provided between the separable parts of the aparatus. These packing materials may be provided between, for example, the lower edge of the stack 58 and the upstanding cylindrical wall 66, between the horizontal wall 64 and the main vertical wall 62 of the casing, between the inner cylindrical wall 63 of the casing and the upstanding wall 21 of the flue aperture, and around the apertures in the main casing wall 62 through which the air pipes 38 and the drain line 78 are passed. It may also be desirable to employ packing material between the upper side of the upstanding flue aperture wall 21 and the lower edge of the air jacket 22 to prevent penetration of hot gases direct from the flue aperture into the space between the bell 48 and the outer wall 23 of the air jacket 22.

Figure 5:
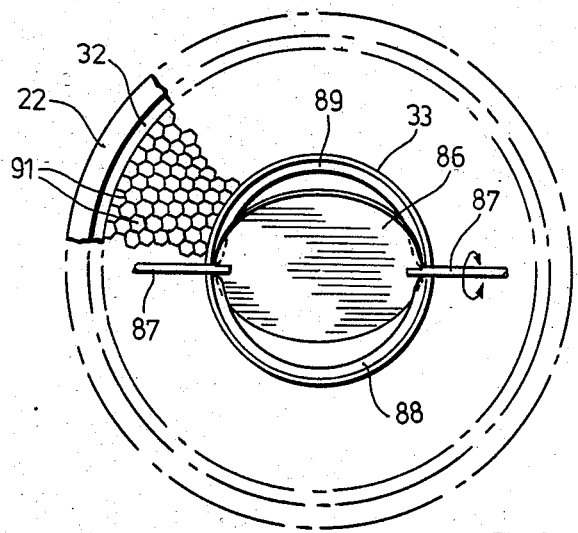
FIG. 5 is a partial plan view similar to FIG. 4 illustrating alternative forms of catalytic unit and bypass valve control means.

In place of the drop valve plates 43, other valve members may be employed to shut off the central bypass openings through the catalytic units 26 and 27. FIG. 5, for example, shows a pivoting butterfly valve arrangement, which has a circular valve plate 86 on opposite sides of which are connected a pair of rods 87. The rods 87 are journalled in pivotal mounts adjacent the upper sides of the inner walls 33 of the catalytic unit. The plate 86 co-operates with a pair of valve seats 88 and 89. The seats 88 and 89 are part-annular in plan, and one seat 88 is offset upward above the pivotal axis of the plate 86, the other seat 89 being offset downwardly below the pivotal axis of the plate 86. A control linkage is provided between one rod 87 and a temperature-controlled motor, similar to the motor 51, and arranged so that when the temperature sensed by the probe 57 exceeds the threshold temperature for operation of the catalytic material the rod 87 and the valve member 86 are rotated to bring the edges of the plate 86 into sealing engagement with the upper surface of the lower valve seat 89 and the lower surface of the upper valve seat 88 and close the bypass opening. When the temperature sensed by the probes 57 falls below the threshold temperature of operation of the catalytic units 26 and 27, the linkage serves to rotate the valve member 86 through 90°, thus leaving open the bypass opening defined within the inner wall 33.

Instead of using the catalytic units of the type shown in FIGS. 2 and 4, having flow passages 34 of varying cross-sections and lengths, catalytic units having catalytic flow passages of uniform cross-section and uniform length may be employed, although with less advantage. FIG. 5, for example, shows a catalytic unit having catalytic flow passages 91 of uniform honeycomb cross-section. Such a catalytic unit may be formed using methods similar to the conventional manufacturing methods e.g. by extrusion of a ceramic material in a plastic condition, the extrusion step being, however, modified to provide a relatively large central opening through the extruded piece, in order to provide the central bypass opening. The extruded piece may then be subjected to the conventional treatments to harden it up to form a self-supporting structure, and to provide the walls of the flow passages 91 with the required catalytic coating.

What we claim as our invention is:

1. In combination: a solid fuel burning stove having a firebox and a flue aperture; a heat exchanger jacket connected to the flue aperture and having a tubular inner wall and a tubular outer wall spaced outwardly therefrom and defining an air space therewith; a catalytic combustor unit disposed in the heat exchanger jacket comprising means for maintaining approximately true pyrolysis in the firebox, including a first catalytic unit and a second catalytic unit spaced longitudinally downstream from the first unit and defining therewith a chamber bounded by an intermediate portion of the inner wall of the heat exchanger jacket, each catalytic unit comprising longitudinally extending walls defining a multitude of small tubular flow passages extending generally longitudinally of the heat exchanger jacket and supporting a catalyst for promoting cracking of hydrocarbons and combustion of carbon monoxide and carbon particles, an air inlet conduit communicating between the surroundings and the air space in the heat exchanger jacket, for introducing secondary combustion air into the air space; and air inlet ports through said portion of the inner wall of the heat exchanger jacket, the ports directing the secondary combustion air non-radially into said chamber, whereby a vortex is created within the chamber to promote homogeneous mixing of the secondary combustion air with the gases passing through the combustor unit; means for efficient warming of said catalytic units to operating temperature comprising each catalystic unit being generally annular in shape and having its outer surface in heat exchange contact with the inner wall of the heat exchanger jacket and its inner surface defining a central gas bypass opening, a valve member associated with each bypass opening, temperature responsive control means responsive to the temperature of gas issuing from the combustor unit and moving each valve member toward a position fully closing each bypass opening when the temperature exceeds a predetermined limit and moving each valve member toward a position relatively opening each bypass opening when the temperature falls below a predetermined limit; means providing adequate residence of gases in said second unit comprising said second unit having its tubular flow passages substantially longer than the flow passages of the first unit; a casing surrounding the heat exchanger jacket, for receiving hot gases issuing from the second catalytic unit, and having an outlet to a stack; and a baffle disposed in the casing between its outlet and the second catalytic unit, the baffle directing said hot gases in heat exchange relationship over the outer side of the outer wall of the heat exchanger jacket.

2. The combination of claim 1 wherein said air inlet ports are spaced regularly around the periphery of said chamber.

3. The combination of claim 1 wherein the air inlet conduit is connected to an end of the jacket proximate to the flue aperture.

4. The combination of claim 1 including a drain in the lower end of the casing for draining liquors condensing within the casing.

5. The combination of claim 1 including an outer heat exchanger jacket surrounding the casing, means for circulating air through the further jacket, and vent openings for venting air from the further jacket to the surroundings.

6. The combination of claim 1 including an opening in the baffle, and a valve member normally closing the opening and being openable to permit gases issuing from the combustor unit to flow direct to the outlet of the housing.

7. The combination of claim 6 including temperature responsive control means responsive to the temperature of exhaust gases issuing from the combustor unit, said control means closing the valve member when the temperature exceeds a predetermined limit and opening the valve member when the temperature falls below a predetermined unit.

8. The combination of claim 1 wherein the second catalytic unit has a downstream face which extends generally transversely of the jacket, and said valve member comprises a refractory insulating material member having a radiant-heat reflective concavely curved inner face spaced from and co-extensive with said end face.

9. The combination of claim 1 wherein each valve member is arranged adjacent a face of the catalytic unit remote from the flue aperture, whereby in its closing position the valve member defines within the catalytic unit a central chamber which is open at one end proximate the flue aperture and is closed at the opposite end by said valve member.

10. The combination of claim 1 wherein the valve member comprises a plate extending transversely of the jacket and movable longitudinally between its closing and opening positions.

11. The combination of claim 1 wherein the valve member comprises a pivoting butterfly valve member and two mutually offset valve seats for co-operating with the valve member.

12. The combination of claim 1 including a flame-arresting screen disposed in the jacket between the flue aperture and the combustor unit.

13. The combination of claim 1 comprising valve means between said air inlet means and the surrounding air, the valve means being adapted to open progressively as the pressure in said chamber falls below the pressure of the surrounding air and to close as the pressure in the chamber increases above that of the surrounding air.

14. The combination of claim 13 wherein said valve means comprise a flap valve.

* * * * *